(12) United States Patent
Gatti

(10) Patent No.: US 6,585,001 B2
(45) Date of Patent: Jul. 1, 2003

(54) FLOW THROUGH RING VALVE FOR PLASTIC EXTRUDING SYSTEMS

(75) Inventor: Joeo M. Gatti, Strongsville, OH (US)

(73) Assignee: Spirex Corporation, Youngstown, OH (US)

( * ) Notice: Subject to any disclaimer, the term of this patent is extended or adjusted under 35 U.S.C. 154(b) by 0 days.

(21) Appl. No.: 09/727,200

(22) Filed: Nov. 30, 2000

(65) Prior Publication Data

US 2002/0063232 A1 May 30, 2002

(51) Int. Cl.$^7$ .................. B29C 45/48; B29C 45/52; F16K 15/06; F16K 15/18
(52) U.S. Cl. .............. 137/533.27; 251/339; 251/344; 425/562; 425/563; 425/DIG. 224; 264/328.1
(58) Field of Search ................ 251/339, 349, 251/351, 352, 353, 354, 344; 425/562, 563, 564, DIG. 224; 264/328.1; 417/459, 513; 137/528, 532, 533

(56) References Cited

U.S. PATENT DOCUMENTS

| | | | | |
|---|---|---|---|---|
| 4,140,238 A | | 2/1979 | Dawson | 222/495 |
| 4,349,044 A | * | 9/1982 | Schirmer | 425/562 |
| 4,377,180 A | * | 3/1983 | Biljes | 425/562 |
| 4,477,242 A | * | 10/1984 | Eichlseder et al. | 425/562 |
| 4,512,733 A | * | 4/1985 | Eichlseder et al. | 425/563 |
| 4,850,851 A | | 7/1989 | Dinerman | 425/562 |
| 5,035,605 A | | 7/1991 | Dinerman et al. | 425/564 |
| 5,044,926 A | | 9/1991 | Dinerman et al. | 425/562 |
| 5,112,213 A | | 5/1992 | Oas | 425/562 |
| 5,164,207 A | | 11/1992 | Durina | 425/382.4 |
| 5,167,971 A | * | 12/1992 | Gill et al. | 425/563 |
| 5,240,398 A | * | 8/1993 | Akaguma et al. | 425/563 |
| 5,439,663 A | | 8/1995 | Manganaro et al. | 264/328.17 |
| 6,435,201 B2 | * | 8/2002 | Holzschuh | 137/533.27 |

OTHER PUBLICATIONS

EMI Marketing and Applications Publication, Mar. 2000.
MD Plastics, Inc. Feb. 2000.
Zeiger Industries 1989.
Spirex *Plasticating Components Technology* 12/97.

* cited by examiner

Primary Examiner—George L. Walton
(74) Attorney, Agent, or Firm—Robert G. Lev

(57) ABSTRACT

A three piece, sliding ring valve for use in a plasticating screw and barrel arrangement has an extended life. The sliding ring has apertures for passing molten resin therethrough. The sliding ring also has annular contact surfaces for spreading the force driving the screw, thereby decreasing the pressure between the sliding ring and the valve retainer. The result is less valve wear and longer life.

7 Claims, 1 Drawing Sheet

FLOW THROUGH RING VALVE FOR PLASTIC EXTRUDING SYSTEMS

TECHNICAL FIELD

The subject invention relates generally to the field of valves for controlling plastic extruding systems. In particular, the present invention is directed to a sliding ring valve having a design that provides a longer operating life than is achieved with similar, conventional designs.

BACKGROUND ART

A variety of devices have been used for mixing and fluxing thermoplastic materials. Conventionally such systems have used extruders with a helical screw rotating within a cylinder or barrel. The extruder barrel has an input port and a discharge port. A high pressure injection molding apparatus cooperates with the extruder at the output side of the discharge port.

The extrusion and molding processes are sequential. First, solid thermoplastic pellets are fed into the extruder barrel though the input port. The rotation of the helical screw, in cooperation with the inner wall of the cylinder, forces the thermoplastic pellets though the extruder. The pellets are heated and melt as a resin. In this form the material moves along the extruder barrel. The molten plastic resin is then fed through the valve. At this point, a volume of air or other material is displaced in the cylinder forcing the screw to retract back to a pre-set position. The screw rotation then stops. With the extrusion step completed, the molten material is injected into the injection molding apparatus.

Providing an even flow of molten material with the desired consistency for the injection molding apparatus is crucial to the efficiency and reliability of the extrusion process. This is critical to the quality of the resulting product. The valve is thus, a key element in any resin handling and extruding process.

The valve is mounted at the downstream or leading end of the helical screw during the injection process. The leading end of the screw is located near the discharge port of the extruder barrel. The valve is normally closed, but is forced open during the extrusion step to allow molten resin material to flow through the valve and thereby displace a volume of air or other material in the cylinder. This procedure allows for the reciprication or retraction of the molten plastic to assure homogenation and composition consistency. The valve also automatically closes following the extrusion step to prevent back-flow of plastic through the extruder during the high pressure injection molding process. The efficient operation of the valve is crucial to the injection molding process.

Non-return check valves and check valves (sometimes referred to as screw tips) are used on most injection and injection blow molding machines. There are a few exceptions such as rigid PVC and thermoset resins. However, in some applications, sliding ring valves are used with rigid PCV. Most conventional check valves used with plastic extruding systems can be divided into two categories: (a) ball check valve; and, (b) sliding ring valve. Of the two, sliding ring type valves are more commonly used. With both types of valves, the forward movement of a plasticating screw is required by the dynamics used for the shut-off operation.

There are advantages and disadvantages to both types of valve. The advantages of the ball check valve are: (a) an efficient, positive shut-off control; (b) efficient shot control; and, (c) a front discharge ball check valve is often less expensive than a sliding ring valve. However, there are also disadvatages to the use of ball check valves. These include: (a) a less streamlined geometry, causing more degradation of heat-sensitive materials; (b) more barrel wear and galling; (c) the side discharge type valves are more expensive than a sliding ring type valves; (d) greater pressure drops occur, therefore creating more heat; (e) poor performance occurs in vented operations; and, (f) ball check valves are much harder to clean.

One derivation of the aforementioned ball check design is the Spirex poppet valve. This valve is described on page 53 of the 1997 Spirex publication entitled *Plasticating Component Technology* incorporated herein by reference as providing background material. This valve can be designed with flutes or grooves for increased mixing capability. The valve also has excellent shut-off characteristics, and is usually used with low viscosity resins. However, this valve is relatively complex.

For this and a number of other reasons, the sliding ring valve is more widely used than the ball check valve in the plastic extrusion molding industry. Of crucial importance is the fact that sliding ring valves are less expensive than side discharge ball check valves. Other advantages of sliding ring valves include: (a) greater streamlining for less degradation of processed materials; (b) best for heat-sensitive materials; (c) less barrel wear; (d) less pressure drop across the valve; (e) well-suited for vented operation; and, (f) easier cleaning than with ball check valves. However, there are some disadvantages to the sliding ring valve, including: (a) less positive shut-off control, especially in 4½ inch diameter and larger size valve; (b) less shot control than is provided with ball check valves; and, (c) sliding ring valves are more expensive than front discharge ball check valves.

There are many variations to the sliding ring design. However, there are certain similarities; as the name implies, a sliding ring is used to provide the shut-off operation. The most common valve used is the three-piece design. This valve is simple, versatile, and relatively inexpensive. Some of the most common variations for sliding ring valves are depicted on pages 53–56 of the aforementioned Spirex publication. These include: (a) a three piece, free flow valve; (b) the four-piece Mallard design; (c) the CMD design; (d) the Castle design; and,(e) the Spirex HMV design. Other designs are also available. One example is the Spirex pin valve design, described on page 55 of the Spirex application materials. Another Spirex design is the "Auto-Shut" valve, described in U.S. Pat. No. 5,164,207, and incorporated herein by reference. This design uses a spring and a thrust bearing to carry out a highly consistent closing operation of the subject valve.

All of the aforementioned valves have advantages and disadvantages. As valve design becomes more complex, the valve must become more expensive since a greater number of parts, and thus, a greater number of manufacturing processes are used to produce the valve. Further, all of the aforementioned valves suffer from wear due to the high pressures involved and the potentially corrosive materials being used. The more complex valves often are more vulnerable to both wear and corrosive degradation due to the higher complexity in the geometries of such valves. Thus, the simple three-piece sliding ring valve is very often used because of its longevity and/or price.

Nonetheless, even the simple, three-piece valves wear out. This wear is caused by the rotation of the screw of the injection molding machine causing the ring to rotate against the retainer. The retainer is usually the part of the valve that wears out most rapidly. Further, most retainers have flutes that provide a flow path for the resin. These flutes reduce the area of contact between the ring and the retainer. It is well-known that contact pressure rises with the reduction in the contact area, there is less metal to wear away, and that metal is under higher contact pressure. The result is a higher degree of wear and a shorter valve life.

One solution is the use of retainer made from a more wear-resistant material. However, the price of making such a retainer is extremely high. As a result, the valve price becomes much higher. Such a modification does not necessarily solve the problem of longevity since wear-resistant material is usually sensitive to torque fracture. This is a factor that cannot be avoided since the rotating assembly of the valve is subjected to high torque as part of the process of moving the screw to extrude the plastic resin.

Another conventional solution is the use of a four-piece (rather than three-piece) valve to reduce wear. The fourth piece is a wear-resistant material while the rest of the retainer is made of a more conventional material. A drawback is that this additional part increases the price of the valve due to the addition of the wear-resistant part.

Accordingly, there is still a need in the plastic extrusion industry for a simple, inexpensive valve that is highly resistant to wear so as to have a high production life. Such a valve must also be highly resistant to accumulations of resin, and the degradation caused by such accumulations. Such a valve must also be highly resistant to fracturing caused by high torques, or the burning of resins at high-pressure valve interfaces.

SUMMARY OF THE INVENTION

Accordingly, it is one object of the present invention to provide a valve that has improved performance over conventional three-piece valves.

It is another object of the present invention to provide a valve that is less expensive than conventional high performance valves.

It is an additional object of the present invention to provide a three-piece valve capable of easily processing heat-sensitive resin without burning the resin.

It is a further object of the present invention to provide a valve that does not have cold-start breakage problems.

It is still a further object of the present invention to provide a valve that is not conducive to accumulations of resin.

It is still another object of the present invention to provide a valve with extremely high flow-through characteristics.

It is yet an additional object of the present invention to provide a valve with an extended production life.

It is again a further object of the present invention to provide a valve with decreased wear at high pressure contact surfaces.

It is still another object of the present invention to avoid labor-intensive structures such as flutes in the manufacturer of valves for injection molding systems.

It is still another object of the present invention to provide a valve design that is sufficiently flexible so that the valve can be modified to a four-piece design.

It is yet an additional object of the present invention to provide a three piece valve with good resin flow control characteristics.

It is again a further object of the present invention to provide a three-piece valve, which is highly wear-resistant, and has the same high flow area as an F-flow valve.

It is still another object of the present invention to provide a three-piece valve having similar discharge characteristics for flushing front end components as are present for conventional side-discharge valves.

It is again a further object of the present invention to provide a three-piece valve that minimizes mechanical interlock between the retainer and the resin.

It is still another object of the present invention to provide a three-piece valve having the advantages of increased contact between the ring and the resin being handled by the valve.

It is yet a further object of the present invention to provide a three-piece valve having an extended production life using materials standard with conventional valves.

These and other goals and objects of the present invention are achieved by a valve for extruding molten material from a plasticating screw and a barrel arrangement. The valve is arranged at a leading edge of the screw and operates proximate the output port of the barrel. The valve has a leading portion and a trailing portion, and consists of a retainer arranged proximate the leading portion. A seat is arranged opposite the retainer and proximate the trailing portion of the valve. The seat includes a second contact surface arranged for a high pressure interface. A sliding ring is arranged to move between the retainer and the seat. The sliding ring includes a plurality of apertures arranged for passing the molten material there through, and has a third and fourth contact surface arranged for high pressure interfaces. These contact surfaces correspond to the first and second contact surface respectively.

DETAILED DESCRIPTION OF THE PREFERRED EMBODIMENTS

Figure 1A:
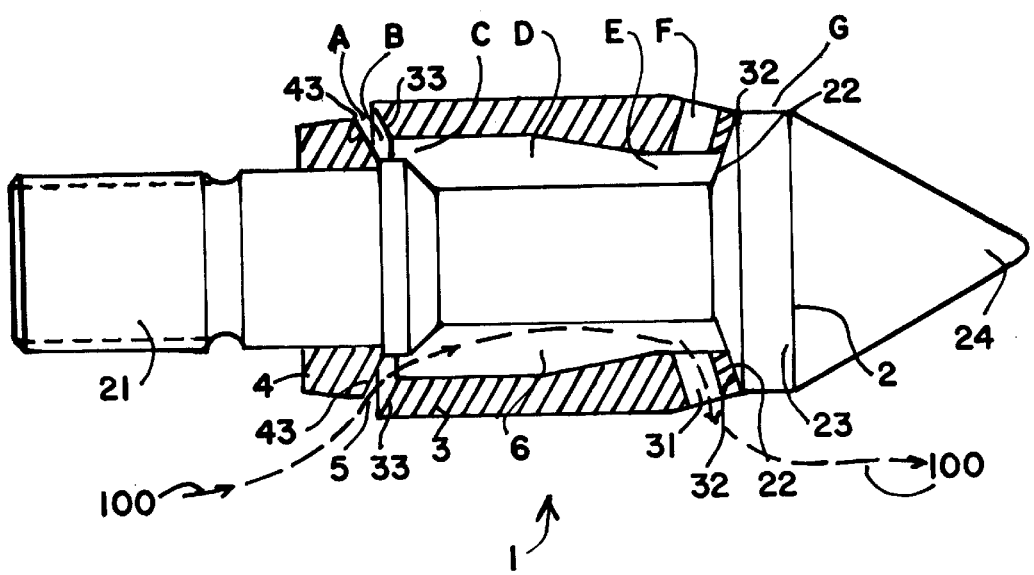
FIG. 1(a) is a side view of the inventive valve, having a sectional depiction of the ring, and exposing the retainer contained within the ring.
Figure 1B:
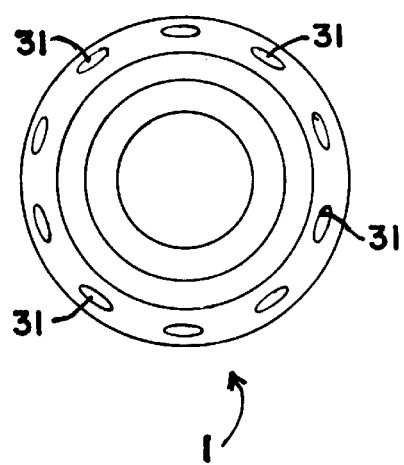
FIG. 1(b) is a front view of the valve of the present invention.

FIGS. 1(a) and 1(b) depict a side view and a front view, respectively of the three-piece sliding ring valve 1 of the present invention. The connection of valve 1 to a plasticating screw (not shown) within a plasticating barrel (not shown) is the same as used with any conventional three-piece valves. Accordingly, no further elaboration is required on either the operation of a plasticating screw within a barrel for purposes of describing the present invention.

Full descriptions of the operation of such screws, in conjunction with conventional valves, within plasticating barrels can be found in the previously cited patents and the Spirex 1997 publication entitled *Plasticating Components Technology*. Likewise, the operation of the inventive valve is very much the same as that found in conventional three-piece sliding ring valves. However, there are a number of structural differences between valve 1 of the present invention and conventional sliding ring valves.

Valve 1 includes three major segments, ring 3, retainer 2 and seat 4. Each of these major components in turn includes a number of components or features. Retainer 2 has a conical or bullet-shaped section 24, connected to a flat annular section 23. Section 21 of retainer 2 is arranged to connect to the end of a plasticating screw (not shown) in a conventional manner.

The sliding ring 3, as is conventional, is moveable between contact with retainer 2, at contact surface 22, and contact with seat 4 at contact surface 43. Contact surface 32 of ring 3 interfaces with contact surface 22 of retainer 2. The overall contact surface 32 is annular in shape, without breaks or any other obstruction that might limit the overall contact surface. As a result, there is a substantial contact area between the retainer 2 and ring 3, approximately 200%–300% greater than that present in conventional three-piece valves.

Further, in contrast to conventional three-piece valves, the annular ring of the present invention is not broken by flutes as is common with conventional three-piece valves. Thus, there is a greater surface area over which to spread the force driving the plasticating screw (not shown) attached to valve 1. The contact surfaces 32 and 22 interface with each other in their entireties, and are both oriented at approximately a 15°–30° angle from the vertical (where the vertical is 90° from the line of travel of the plasticating screw).

The apertures 31, through which resin flows (100), are likewise arranged at angels of between 15° and 30° from the vertical. As a result, the flushing characteristics of side aperture valves can be achieved while still maintaining all of the advantages of standard forward-facing apertures. However it should be noted that the foremost advantage of the present invention is the increased contact area at contact faces 32 and 22.

An increased contact area is found at the interface of contact surfaces 33 and 43. However, this is not nearly as crucial to extending the life of the valve as contact surfaces 32 and 22. Rather, the interface between contact surfaces 43 and 33 is important for an efficient cut-off of the resin flow 100, conventionally, such resin flow occurs when the screw is backing to force ring 3 against retainer 2 as the resin flow goes through a gap 5 between the seat 4 and the ring 3. The resin flows through a space 6 between the interior ring 3 and the outer diameter of retainer 2. The resin flow is partially controlled by the angle that it must negotiate to go through apertures 31 so that the resin can be forced under a desired pressure into an external mold (not shown).

Because of the smooth annular contact surfaces 32, 22, and the large area encompassed by the annular shape of the contact surfaces, the overall productive life of valve 1 is substantially increased over that of conventional three-piece valves. However, there are other advantages. For example, valve 1 provides very little structure on which to accumulate resin. The disadvantages of such resin accumulation are already well-known in this art and the avoidance of such accumulation is one of the general goals in most valve design. The present invention provides very little opportunity for such accumulation due to a geometry that facilitates the free flow of the resin past all valve surfaces. The gap size between surfaces, whenever they occur are always of sufficient size and geometry so that resin flow is facilitated and accumulation inhibited. By avoiding the accumulation of any resin near the interface surfaces of the valve 1, stress is avoided and the chance of valve fracture or other failure is avoided.

A number of valves of the present design have been tested and exhibit the superior characteristics previously specified. One of the valves tested is approximately 5.034 inches in length, and 1.57 inches in diameter (from the widest tips of the ring 3 at flow location A). The leading portion of the valve is conical in shape, and has an angle of approximately 30° from the horizontal.

When the sliding ring 3 is forced up against the retainer 2 so that the contact surfaces 32 and 22 are in close contact, a gap between the ring and the seat 4 is approximately 0.11 inches. The greatest width of the retainer is approximately 1.263 inches. The largest inside diameter of ring 3 is approximately 1.194 inches while the narrowest inside diameter of the ring is approximately 0.96 inches. The contact area is approximately 0.523 square inches.

Using standard flow calculations in which a donut-shaped resin flow of 100% is calculated in a conventional manner based upon a comparison of different diameters of the valve, it was determined that excellent flow characteristics were achieved for the three-piece valve 1 depicted in FIG. 1(a). Based upon the calculated flows for the subject valve 1, the flow at area A is a 108%. Further into the gap 5, the flow is 86% at area B while falling to only 85% at area C. In area D, the flow is 168%, narrowing to 90% at area E. Because of the sharp turn that the resin flow 100 must make to go through the aperture 31, the flow at area F is 86%. However, the measured flow at area G is 101% thereby contributing to the excellent forward-flushing characteristics of valves configured according to the present invention.

The excellent flow characteristics of the present invention were measured on a device having the aforementioned dimensions, and configured as shown in FIG. 1(a). It should be noted that eight holes were used in this device. Each of the holes is approximately 0.25 inches in diameter. The holes are spaced regularly from each other, with centers separated from each other by 45°. The flow characteristics exhibited by the subject valve obtain many of the benefits of side discharge port valves as well as the benefits of forward discharge port valves. Flow characteristics of the present invention are such that when the gap forms between contact surfaces 32 and 22, there is little chance of accumulating resin at these points. This is also true for gap 5 between contact surfaces 33 and 43. Further, substantial contact between the exterior of ring 3 and the resin flowing outside of the ring is achieved without the drawback of flutes or an elongated leading portion 24, both of which are vulnerable to drawbacks already well-known in this art.

While the terms "resin" or "plastic resin" have been used throughout the application for the sake of expediency, it should be noted that the materials that can be handled by the inventive valve are not limited thereto. Rather, as is well-known in this art, the plastic resin is merely a binder for a wide variety of other materials. These are generally mixed in with the resin, and are specified by the nature of the final product to be molded. Accordingly, one skilled in this art would expect that a wide variety of materials can be mixed with the plastic resin. These include such materials as carbon, glass, and other materials already well-known in this art.

While the present invention is preferably directed to a three-piece valve, the design can be modified to permit the placement of a fourth piece as the interface between ring 3 and retainer 2, so that the contact surfaces 32 and 22 can be constituted by extremely durable materials. Depending upon the materials constituting the ring and the contact surface 22 of the retainer 2, the added fourth piece can be bonded to either ring 3 or retainer 2 so that all rotational movement is between contact surfaces that have the material best suited for such duty.

While a number of preferred embodiments and their variations have been described by way of example, the present invention is not limited thereby. Rather, the present invention should be construed to include any and all modifications, variations, permutations, adaptations and embodiments that would occur to one skilled in this art having been taught the present invention. Accordingly, the present invention is to be limited only by the following claims.

I claim:

1. A valve for extruding molten material from a plasticating screw and barrel arrangement, where said valve is arranged at a leading edge of said screw and operates proximate an output of said barrel, said valve having a leading portion, a trailing portion, and a central portion, said valve comprising:

(a) a retainer arranged proximate said leading portion and comprising a first contact surface arranged for a high-pressure interface;

(b) a seat arranged opposite said retainer and proximate said trailing portion, and comprising a second contact surface arranged for a high pressure interface; and, (c) a sliding ring arranged to move between said retainer and said seat, said sliding ring comprising a plurality of apertures arranged for passing said molten material there through, and having a third and fourth contact surfaces arranged for high pressure interfaces and selectively mating with said first and second contact surfaces, respectively, said third contact surface comprising a continuous, unbroken annular configuration, said sliding ring and said central portion forming a resin passage along the internal length thereof with said apertures at a front end of said resin passage and a space between said second and said fourth contact surfaces to receive said resin at a rear end of said resin passage when said second and fourth contact surfaces are not engaged, said resin passage being larger at said rear end than at said front end to facilitate strong forward flushing action, said plurality of apertures being spaced from said third contact surface to facilitate free, even flow of said molten material wherein accumulation of resin residue is substantially limited.

2. The valve of claim 1, wherein said first, second, and fourth contact surfaces are annular in configuration.

3. The valve of claim 2, wherein said molten material comprises plastic resin.

4. The valve of claim 3, wherein said first and third contact surfaces are oriented substantially at an angle of between 15° and 30° from vertical.

5. The valve of claim 4, wherein said apertures have cylindrical sidewalls oriented at substantially between 15° and 30° from vertical.

6. The valve of claim 5, wherein said leading portion comprises a cone.

7. The valve of claim 6, wherein said trailing portion comprises means for connecting to said screw.

* * * * *